(12) United States Patent
Provost

(10) Patent No.: US 7,413,025 B2
(45) Date of Patent: Aug. 19, 2008

(54) TORQUE TOOL

(76) Inventor: Dan Provost, 4374 Bridgeview Street, Abbotsford, B.C. (CA) V4X 1W8

( * ) Notice: Subject to any disclaimer, the term of this patent is extended or adjusted under 35 U.S.C. 154(b) by 63 days.

(21) Appl. No.: 11/628,073

(22) PCT Filed: Oct. 25, 2004

(86) PCT No.: PCT/CA2004/001869

§ 371 (c)(1),
(2), (4) Date: Nov. 30, 2006

(87) PCT Pub. No.: WO2006/021073

PCT Pub. Date: Mar. 2, 2006

(65) Prior Publication Data

US 2007/0227315 A1  Oct. 4, 2007

(30) Foreign Application Priority Data

Aug. 21, 2004  (CA) .................................. 2471616

(51) Int. Cl.
B25B 23/14 (2006.01)
(52) U.S. Cl. .................. 173/29; 173/176; 173/216; 173/217; 81/57.39
(58) Field of Classification Search ............... 173/29, 173/176, 216, 217, 132, 171; 81/177.75, 81/57.39, 55, 57.44, 56
See application file for complete search history.

(56) References Cited

U.S. PATENT DOCUMENTS

| | | | | | |
|---|---|---|---|---|---|
| 2,536,017 | A | * | 1/1951 | Bamberger | .................. 279/48 |
| 3,724,237 | A | * | 4/1973 | Wood | .......................... 464/177 |
| 4,823,887 | A | * | 4/1989 | Umeda | ......................... 173/31 |
| 5,203,239 | A | * | 4/1993 | Sergan et al. | .............. 81/57.39 |
| 5,823,075 | A | * | 10/1998 | Torrekens | ................... 81/57.39 |
| 6,039,126 | A | * | 3/2000 | Hsieh | .......................... 173/216 |
| 6,260,443 | B1 | | 7/2001 | Spirer | |
| 6,273,200 | B1 | * | 8/2001 | Smith et al. | .................. 173/216 |
| 6,352,127 | B1 | * | 3/2002 | Yorde | .......................... 173/216 |
| 6,490,952 | B2 | | 12/2002 | Junkers | |
| 6,715,381 | B2 | | 4/2004 | Junkers | |
| 6,814,157 | B2 | * | 11/2004 | Maras | .......................... 173/171 |
| 7,021,399 | B2 | * | 4/2006 | Driessen | ....................... 173/29 |
| 7,021,400 | B2 | * | 4/2006 | Oretti | ............................ 173/29 |
| 7,134,508 | B2 | * | 11/2006 | Prell et al. | ..................... 173/29 |
| 2003/0079575 | A1 | | 5/2003 | Blanco Guajardo et al. | |

\* cited by examiner

*Primary Examiner*—Scott A. Smith
(74) *Attorney, Agent, or Firm*—Frederick Kaufman Inc.

(57) ABSTRACT

A torque tool comprises a torque converter, a power tool for actuating the converter and an attachment adapter, interposed between the torque converter and the power tool, for coaxially and firmly interconnecting the former to the latter. The power tool, having its chuck removed, includes, at its front part, an outwardly extending shaft of tubular configuration incorporating a dead hole of hexagonal cross-section. The torque converter includes several coaxially successive planetary gear assemblies, first of which being driven by a first sun gear. The latter together with a hexagonal shaft form a unitary element. The hexagonal shaft is shaped and sized to fit and drivingly engage the dead hole of the outwardly extending shaft.

2 Claims, 3 Drawing Sheets

TORQUE TOOL

I. BACKGROUND OF THE INVENTION

1. Field of the Invention

The present invention relates generally to the field of torque tools. More specifically, it relates to a torque tool which integrates well known and long tested subassemblies into a unitary assembly that provides a greatly amplified output torque.

2. Field of the Invention

Technological production in various industries requires high torques tools with lower angular velocities than in the power generating subassemblies.

Various transmission mechanisms with reduction gears are employed to transmit motion from an electric, pneumatic or hydraulic prime mover to an output shaft of a torque converter.

The following disclosures, identified in the prior art, relate to various types of torque tools:

Sasaki (U.S. Patent Application Publication No. 2004/0055432 A1, published Mar. 25, 2004);

Chen (U.S. Pat. No. 6,655,470 B1, issued Dec. 2, 2003);

Holzer et al. (U.S. Patent Application Publication No. 2003/0173097 A1, published Sep. 18, 2003);

Tang (U.S. Patent Application Publication No. 2002/0185290 A1, published Dec. 12, 2002);

Tsai (U.S. Pat. No. 6,435,285 B1, issued Aug. 20, 2002); and

Provost (U.S. Pat. No. 6,401,572 B1, issued Jun. 11, 2002

The applicant believes that the cited disclosures, taken alone or in combination, neither anticipate nor render obvious the present invention. The foregoing citations do not constitute an admission that such disclosures are relevant or material to the claims. Rather the disclosures are related to the field of the invention and are cited as constituting the closest art of which the applicant is aware.

III. SUMMARY OF THE INVENTION

The Applicant believes that there is a need for a torque tool, which is compact, simple to use and well engineered so that the components are highly reliable cited as constituting the closest art of which the applicant is aware.

Broadly stating, the torque tool, according to the present invention, comprises:

a power tool;

a torque converter actuated by said power tool; and an attachment adapter, interposed between said torque converter and said power tool, for coaxially and firmly interconnecting the former to the latter;

said power tool, with its chuck removed, including an outwardly extending shaft provided with a dead hole;

said torque converter comprising a housing incorporating several consecutive gear assemblies, at the input extremity of said housing facing said power tool, a gear inserted in said housing, for transmitting a torque from said power tool to said several consecutive gear assemblies of said torque converter, extending into a shaft shaped and sized to fit and drivingly engage an internal configuration of said dead hole of said outwardly extending shaft; and the attachment adapter being provided with bolting means for attaching to the power tool and with fastening means for attaching to a plate axially and rotationally secured in the housing.

In one aspect of this invention, the torque tool comprises:

a torque converter;

a power tool for actuating the converter;

an attachment adapter, interposed between the torque converter and the power tool, for coaxially and firmly interconnecting the former to the latter.

The power tool, having its chuck removed, includes, at its front part, a collar provided with securing elements, followed by an adjustment annular structure for presetting a required working torque, and then by an outwardly extending shaft of tubular configuration incorporating a dead hole of hexagonal cross-section.

The torque converter comprises:

a housing of tubular structure having at its input end, contiguous to the attachment adapter, an internally threaded portion, successively followed, toward an opposite output end, by an internally toothed portion and, then, by a cylindrical bore, the internally threaded portion having a larger diameter than the diameter of the internally toothed portion, while the cylindrical bore has a lesser diameter than the diameter of the internally toothed portion;

an externally threaded flange, provided with an outwardly projecting cylindrical extension, and used to be turned into the housing, when all the components of the torque converter are already mounted in the latter for engaging in the internally threaded portion; the externally threaded flange is provided with a central circular aperture, around which four axially through holes are equidistantly disposed on a circumference;

an index plate comprising a flat ring extending into a sleeve of lesser diameter facing the power tool, the flat ring being provided with a plurality of perforations disposed to coincide with the circumference on which the four axially through holes are disposed; the sleeve, includes four axially threaded openings, is inserted into the central circular aperture of the externally threaded flange and at least two compression springs are inserted into a pair of the four axially through holes; each of said at least two compression springs acts on a ball partially captivated in one of the perforations of the index plate, the latter, and, consequently, the torque converter being fastened through the four axially threaded openings, via the attachment adapter, to the power tool The housing further incorporates within, following the index plate, the followings:

an unitary element comprising a hexagonal shaft extending into a first journal, followed by a first sun gear, a cross-section of the first journal being larger then a cross-section of the hexagonal shaft; the hexagonal shaft is so configured as to engage to threaded hole of the outwardly extending shaft;

several coaxially successive planetary gear assemblies, first of which being driven by the first sun gear, while planet pinions, belonging to the several coaxially successive planetary gear assemblies, mesh with the internally toothed portion of the housing; and the attachment adapter, constituting a unitary structure, comprises a tubular central part extending backwardly into a fastening collar and forward into a flanged structure; the tubular central part is disposed around the adjustment annular structure and has a window at each side, adapted for accessing and rotating, with two opposed fingers, the adjustment annular structure; the fastening collar has an internal configuration to encompass the collar of the power tool and is provided with at least one perforation coaxial with at least one of the threaded holes of the collar; bolting elements for engaging the at least one of the threaded holes are inserted through the at least one perforation; the flanged structure incorporates a cylindrical portion, partially closed by a perpendicular wall, somewhat retracted from a front of the cylindrical section, a stepped sleeve projecting from the perpendicular wall comprises a first sleeve extending into a second sleeve; the first sleeve is provided with four equally spaced apertures, coinciding with the four axially threaded openings of the index plate, and projecting out of the perpendicular wall, without extending past the cylindrical section; the second sleeve being of lesser diameter than the first sleeve and extending outwardly past the first sleeve; an annular recession is formed between the perpendicular wall, the cylindrical section and the sleeve, and is seized to receive the externally threaded flange, namely its outwardly extending cylindrical extension; the second sleeve contains a mounting hole for locating a bearing supporting the first journal of the unitary element; and fastening elements, inserted from the interior of the attachment adapter and traversing the four equally spaced apertures, are used for engaging in the four axially threaded openings of the index plate, whereby the torque converter is firmly joined, via the attachment adapter, to the power tool.

III. BRIEF DESCRIPTION OF THE DRAWINGS

Although the characteristic features of the invention will be particularly pointed out in the claims, the invention itself and the manner in which it may be made and used may be better understood by referring to the following description and accompanying drawings. Like reference numerals refer to like parts throughout the several views of the drawings in which:

IV. DESCRIPTION OF THE PREFERRED EMBODIMENT

Figure 1:
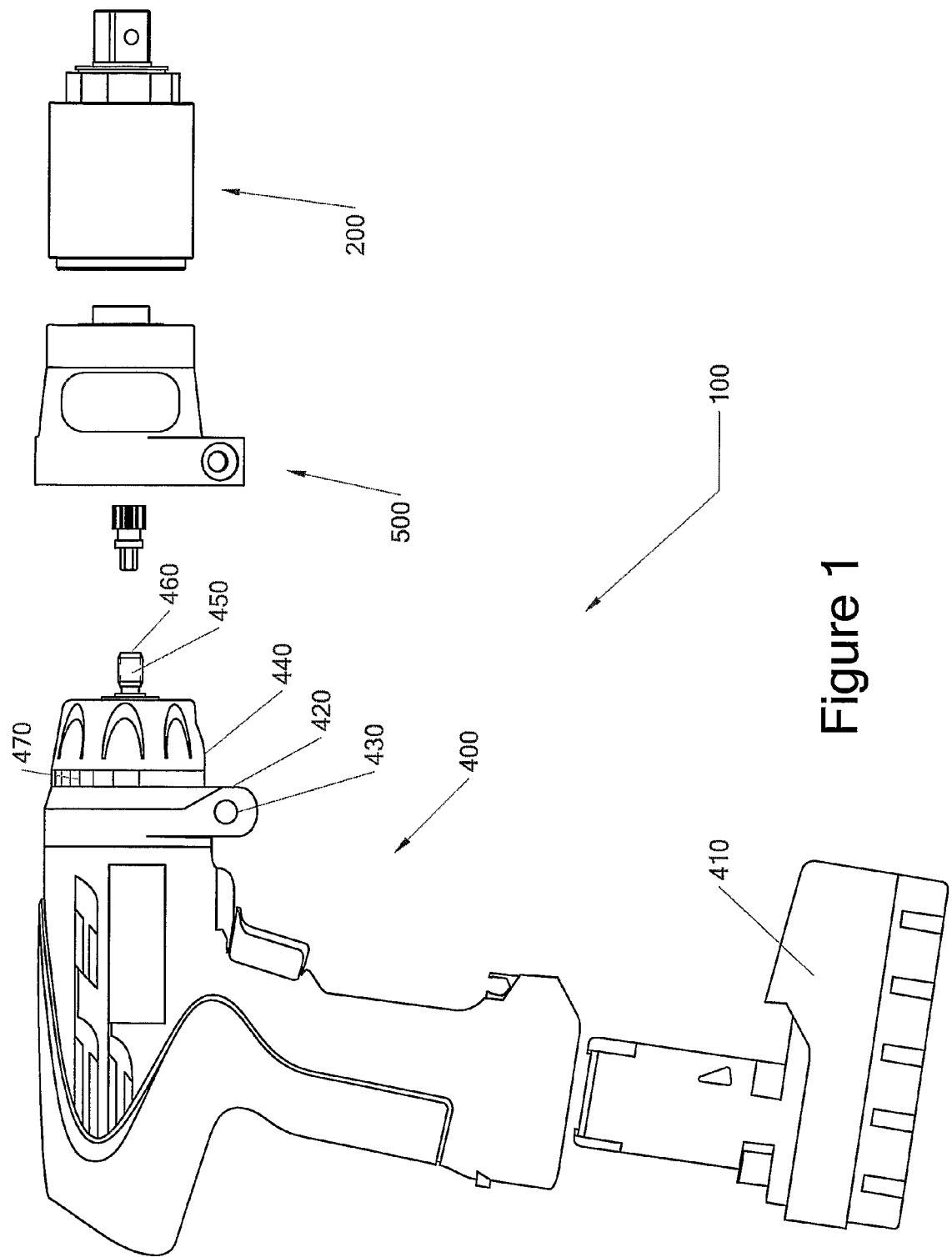
FIG. 1 illustrates a front exploded view of the present invention.

As illustrated in FIG. 1, a torque tool 100 basically includes a torque converter 200 and an electric power tool 400 for actuating the latter. Electric power tool 400 is hand-held, of conventional design, which is, in the present embodiment, conveniently, but not exclusively, powered by a battery 410. An attachment adapter 500 is interposed between torque converter 200 and electric power tool 400 for coaxially and firmly interconnecting the former to the latter. Electric power tool 400, having its chuck removed, includes, at its front part, a collar 420, provided at its lower part with two opposite threaded holes 430 adapted for securing a left or right handle (not shown), followed by an adjustment annular structure 440 for presetting a required working torque and, then, by an outwardly extending shaft 450. The latter has a tubular configuration with a dead hole 460 of hexagonal cross-section. A strip 470 with a plurality of reference numbers, corresponding to different magnitudes of torques, is attached on an upper part of adjustment annular structure 440. Collar 420 has on its top a protruding arrow (not shown).

Figure 2:
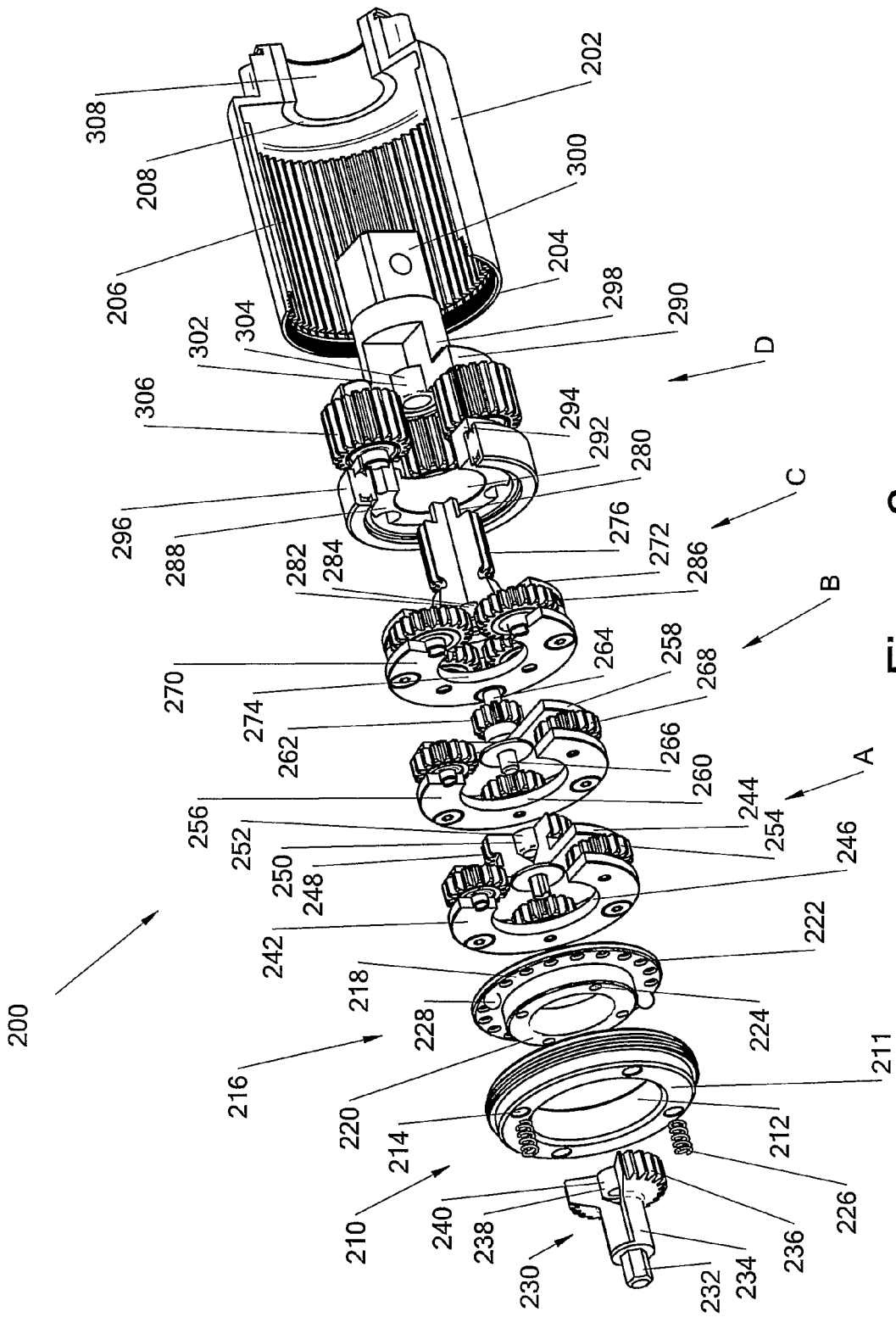
FIG. 2 illustrates an exploded perspective view of the torque tool employed in this invention.

Torque converter 200 is best illustrated in FIG. 2. As shown therein, torque converter 200 comprises a housing 202 of tubular structure having at its input end, contiguous to attachment adapter 500, an internally threaded portion 204. Successively, toward an opposite output end, internally threaded portion 204 is followed by an internally toothed portion 206 and a cylindrical bore 208. Internally threaded portion 204 has a larger diameter than the diameter of internally toothed portion 206, while cylindrical bore 208 has a lesser diameter than the latter. An externally threaded flange 210 is provided with an outwardly extending cylindrical extension 211 and is used to be turned into housing 202 (when the components of torque converter 200 are already mounted therein) for engaging in internally threaded portion 204. Externally threaded flange 210 is provided with a central circular aperture 212 and four axially through-holes 214, equidistantly disposed on an imaginary circle coaxial with its longitudinal axis. An index plate 216 comprises a flat ring 218 extending into a sleeve 220 of lesser diameter facing electric power tool 400. Flat ring 218 is provided with a plurality of perforations 222, equally spaced apart along an imaginary circle lying in a plan perpendicular to and centered on the longitudinal axis of index plate 216. This imaginary circle and the above imaginary circle of externally threaded flange 210 coincide. Sleeve 220, which includes four axially threaded openings 224, is inserted with an easy-slide fit into central circular aperture 212 of externally threaded flange 210. A pair of compression springs 226 is inserted into a pair of the four axially through-holes 214. Each compression rings 226 acts on a ball 228, partially captivated in one of the plurality of perforations 222 of index plate 216. Index plate 216, respectively torque converter 200, is secured through its four axially threaded openings 224, via attachment adapter 500, to electric power tool 400. Should a relative rotation between torque converter 200 and electric power tool 400 become necessary in order to achieve a comfortable work position, a torsion moment must be manually applied. Thus, balls 228 are forced to penetrate completely into a pair of axially through-holes 214 and disengage from the plurality of perforations 222 of index plate 216. A relative sliding between confronting faces of externally threaded flange 210 and index plate 216 occurs as long as a torsion moment is applied. Then, balls 218 will again be partially captivated simultaneously in a pair of the four axially through-holes 214 and in a pair of the plurality of perforations 222 of index plate 216. Thus, a relative position between torque converter 200 and electric power tool 400 is maintained.

Housing 202 incorporates within, starting from the end contiguous to electric power tool 400, the following items:

an unitary element 230 comprising a hexagonal shaft 232 that extends into a first journal 234, which is followed by a first sun gear 236 (a cross-section of first journal 234 is larger than that of hexagonal shaft 232); hexagonal shaft 232 is designed for engagement, with a close-running fit, in dead hole 460; first sun gear 236 is centrally provided with a first blind hole 238, wherein a first needle bearing 240 is mounted;

a first planetary gear assembly A including a first and second disc-shaped plates 242 and 244, respectively, parallel to each other and firmly secured together, first disc-shaped plate 242 being provided with a first central opening 246 for a free passage of first sun gear 236, while second disc-shaped plate 244 extends outwardly into a second sun gear 248, centrally provided with a second blind hole 250, wherein a second needle bearing 252 is mounted;

three first planet pinions 254, equally spaced along an imaginary circle lying in a plan perpendicular to and centered on an axial line common to first and second sun gears 236 and 248, respectively, and so disposed between and secured to first and second disc-shaped plates 242 and 244 as to enable each of them to freely rotate around their central axes; three first planet pinions 254 are so configured and situated as to engage internally toothed portion 206 of housing 202;

a second planetary gear assembly B including a third and forth disc-shaped plates 256 and 258, respectively, parallel to each other and firmly secured together, third disc-shaped plate 256 being provided with a second central opening 260 for a free passage of second sun gear 248, while forth disc-shaped plate 258 extends: a) outwardly into a third sun gear 262 that ends in a second journal 264 and b) inwardly into a third journal 266;

three second planet pinions 268, equally spaced along an imaginary circle lying in a plan perpendicular to and centered on an axial line common to second and third sun gears 248 and 262, respectively, and so disposed between and secured to third and forth disc-shaped plates 256 and 258, as to enable each of them to freely rotate around their central axes;

three second planet pinions 268 being so configured and situated as to engage internally toothed portion 206 of housing 202;

a third planetary gear assembly C including a fifth and sixth disc-shaped plates 270 and 272, respectively, parallel to each other and firmly secured together, fifth disc-shaped plate 270 being provided with a third central opening 274 for a free passage of third sun gear 262, while sixth disc-shaped plate 272 extends outwardly into a fourth sun gear 276 that continues with a fourth journal 280;

disc-shaped plate 272 is further provided (facing fifth disc-shaped plate 270) with a third blind hole 282, wherein a third needle bearing 284 is mounted; the latter supports third journal 264;

four third planet pinions 286, equally spaced along an imaginary circle lying in a plan perpendicular to and centered on an axial line common to third sun and fourth sun gears 262 and 276, respectively, and so disposed between and secured to fifth and sixth disc-shaped plates 270 and 272 as to enable each of them to freely rotate around their central axes; four third planet pinions 286 are so configured and situated as to engage internally toothed portion 206 of housing 202; and a fourth planetary gear assembly D a first and second inter-jaw coupling members 288 and 290, respectively, parallel to each other and firmly interconnected together, first inter-jaw coupling member 288, which is directed towards third planetary gear assembly C, being provided: a) with a fourth central opening 292, for a free passage of fourth sun gear 276, and b) with a cylindrical shoulder 294; a rolling contact antifriction bearing 296 having its inner race firmly fitted onto cylindrical shoulder 294 and its outer race inserted into internally toothed portion 206 of housing 202; second inter-jaw coupling 290 extends outwardly into a concentric hub 298, which is followed by a driving shaft 300, adapted to transmit a torque to a nut socket and alike (not shown); second inter-jaw coupling 290 is further provided with a fourth blind hole 302, directed towards first inter-jaw coupling member 288 and fitted with a fourth needle bearing 304; the latter supports journal 280;

three fourth planet pinions 306, equally spaced along an imaginary circle lying in a plan perpendicular to and centered on an axial line passing through concentric hub 298, and so disposed between and secured to first and second inter-jaw coupling members 288 and 290 as to enable each of them to freely rotate around their central axes; three fourth planet pinions 306 are so configured and situated as to engage internally threaded portion 204 of housing 202; a fifth needle bearing 308 is inserted with a close fit into cylindrical bore 208 of housing 202 and is intended to support concentric hub 298; three fourth planet pinions 306 are so configured and situated as to engage internally threaded portion 204 of housing 202; and a flat annular washer (not shown) is interposed between second inter-jaw coupling member 290 and cylindrical bore 208 of housing 202.

It is obvious, that the successive reduction of speed from first planetary gear A to fourth planetary gear assembly D is accompanied successively by a corresponding augmentation of generated torques. Hence, planetary gear assemblies A-D are calculated and designed accordingly.

Figure 3:
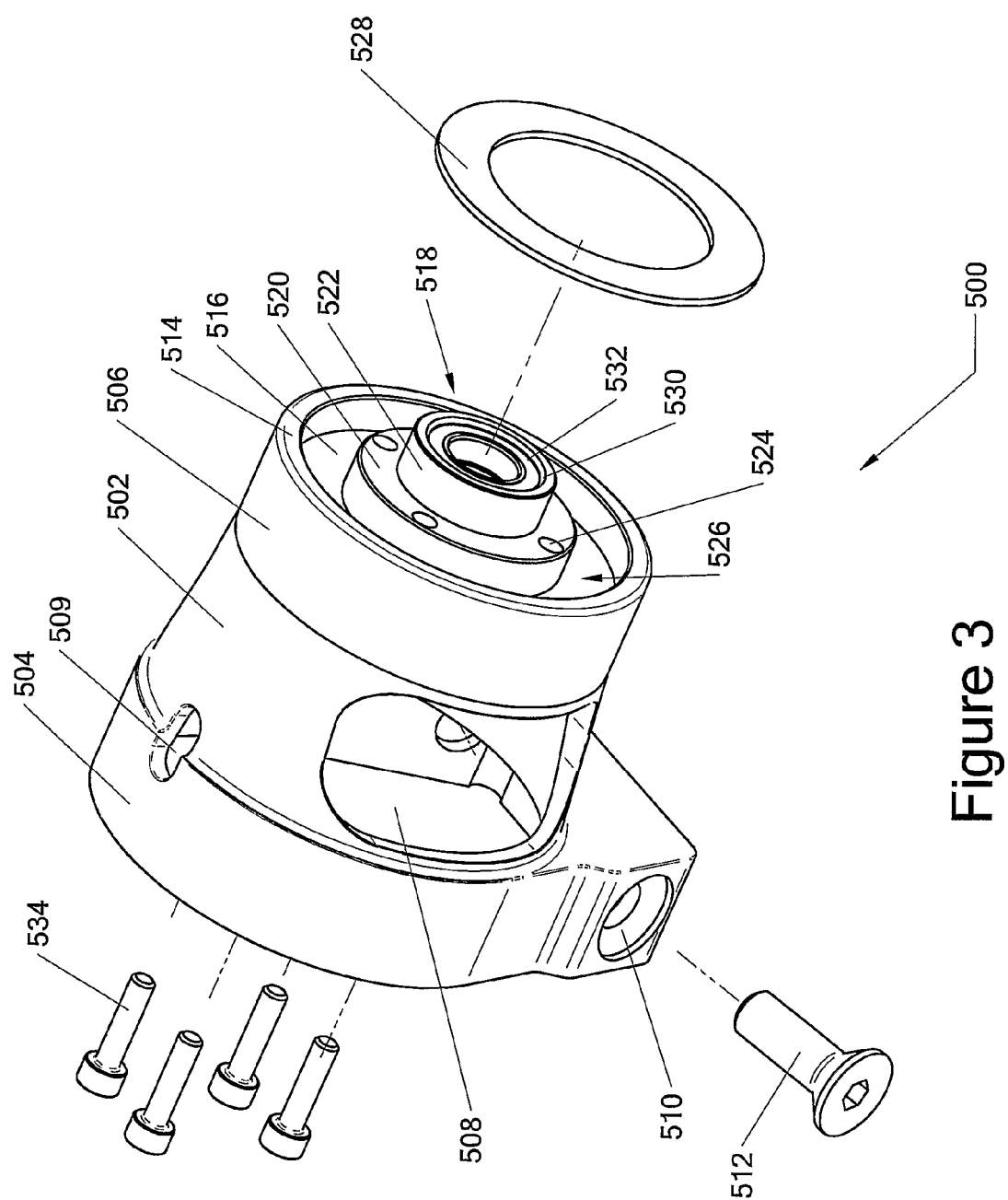
FIG. 3 illustrates an exploded perspective view of the attachment adaptor incorporated in the present invention.

Attachment adapter 500 (FIG. 3) constitutes a unitary structure comprising a tubular central part 502 that extends backwardly into a fastening collar 504 and frontward into a flanged structure 506. Tubular central part 502 is disposed essentially around adjustment annular structure 440 and first has a window 508 at each side, adapted for accessing and then rotating, with two opposed fingers, adjustment annular structure 440, and second—a visual aperture 509, at the top. The latter corresponds to strip 470. Fastening collar 504 has an internal configuration adapted to entirely encompass collar 420 of electric power tool 400 and is provided, at its lower part, with a pair of oppositely located, truncated cone-shaped perforations 510. The latter are coaxial with threaded holes 430 drilled into collar 420. A pair of countersunk bolts 512 is inserted through the pair of oppositely located, truncated cone-shaped perforations 510 for engaging in threaded holes 430. Flanged structure 506 incorporates a cylindrical section 514, partially closed by a perpendicular wall 516, somewhat retracted from a front of cylindrical section 514. A stepped sleeve 518, projecting out of perpendicular wall 516, comprises a first sleeve 520, which extends into a second sleeve 522. The former is provided with four equally spaced apertures 524, disposed to coincide with four axially threaded openings 224 of index plate 216. First sleeve 520 projects out of perpendicular wall 516, without extending past cylindrical section 514. Second sleeve 522 is of lesser diameter than first sleeve 520 and extends outwardly past first sleeve 520. An annular recession 526 is formed between perpendicular wall 516, cylindrical section 514 and first sleeve 520. Annular recession 526 is dimensioned to receive externally threaded flange 210, namely its outwardly extending cylindrical extension 211. A thrust washer 528 is placed in annular recession 526, in contact with perpendicular wall 516, prior of inserting outwardly extending cylindrical extension 211. Second sleeve 522 contains a mounting hole 530 for inserting a bearing 532 that supports first journal 234 of unitary element 230 that incorporates first sun gear 236. Fasteners 534, inserted from the interior of attachment adapter 500, traverse four equally spaced apertures 524 and engage in four axially threaded openings 224 of index plate 216. Thus, torque converter 200 is firmly joined, via attachment adapter 500, to electric power tool 400.

As required, a detailed embodiment of the present invention is disclosed herein; however, it is to be understood that the disclosed embodiment is merely exemplary of the invention which may be embodied in various forms. Therefore, specific structural and functional details disclosed herein are not to be interpreted as limiting, but merely as a basis for the claims and as representative basis for teaching one skilled in the art to variously employ the present invention in virtually any appropriately detailed structure.

What is claimed is:

1. A torque tool comprising
a power tool;
a torque converter actuated by said power tool; and
an attachment adapter, interposed between said power tool and said torque converter, for coaxially and firmly interconnecting said power tool to said torque converter;
said power tool, with its chuck removed, including an outwardly extending shaft provided with a dead hole;
said torque converter comprising a housing incorporating several consecutive gear assemblies, at an input extremity of said housing facing said power tool, a gear, inserted in said housing for transmitting a torque from said power tool to said several consecutive gear assemblies of said torque converter, extending into a shaft shaped and sized to fit and drivingly engage an internal configuration of said dead hole of said outwardly extending shaft; and
said attachment adapter being provided with bolting means for attaching to said power tool and with fastening means for attaching to a plate axially and rotationally secured in said housing.

2. A torque tool comprising
a torque converter;
a power tool for actuating said converter;
an attachment adapter, interposed between said torque converter and said power tool, for coaxially and firmly interconnecting said torque converter to said power tool;
said power tool, having its chuck removed, including, at a front part, a collar provided with means for securing, followed by an adjustment annular structure for presetting a required working torque, and then by an outwardly extending shaft of tubular configuration incorporating a dead hole of hexagonal cross-section;
said torque converter comprising
a housing of tubular structure having at an input end, contiguous to said attachment adapter, an internally threaded portion, successively followed, toward an opposite output end, by an internally toothed portion and, then, by a cylindrical bore, said internally threaded portion having a larger diameter than the diameter of said internally toothed portion, while said cylindrical bore has a lesser diameter than the diameter of said internally toothed portion;
an externally threaded flange, provided with an outwardly projecting cylindrical extension, and used to be turned into said housing, when all the components of said torque converter are already mounted in said housing, for engaging in said internally threaded portion, said externally threaded flange being provided with a central circular aperture, around which four axially through holes are equidistantly disposed on a circumference;
an index plate comprising a flat ring extending into a sleeve of lesser diameter facing said power tool, said flat ring being provided with a plurality of perforations disposed to coincide with said circumference on which said four axially through holes are disposed, said sleeve, including four axially threaded openings, being inserted into said central circular aperture of said externally threaded flange, at least two compression springs being inserted into a pair of said four axially through holes, each of said at least two compression springs acting on a ball partially captivated in one of said perforations of said index plate, said index plate, and, consequently, said torque converter being fastened through said four axially threaded openings, via said attachment adapter, to said power tool;
said housing further incorporating within, following said index plate, the following:
an unitary element comprising a hexagonal shaft extending into a first journal, followed by a first sun gear, a cross-section of said first journal being larger then a cross-section of said hexagonal shaft, said hexagonal shaft being so configured as to engage to said dead hole of said outwardly extending shaft;
several coaxially successive planetary gear assemblies, first of which being driven by said first sun gear, while planet pinions, belonging to said several coaxially successive planetary gear assemblies, mesh with said internally toothed portion of said housing; and said attachment adapter, constituting a unitary structure, comprising a tubular central part extending backwardly into a fastening collar and forward into a flanged structure, said tubular central part being disposed around said adjustment annular structure and having a window at each side, adapted for accessing and rotating, with two opposed fingers, said adjustment annular structure;
said fastening collar having an internal configuration to encompass said collar of said power tool and being provided with at least one perforation coaxial with at least one of said threaded holes of said collar; bolting means being for engaging said at least one of said threaded holes is inserted through said at least one perforation being used; said flanged structure incorporating a cylindrical portion, partially closed by a perpendicular wall, somewhat retracted from a front of said cylindrical section, a stepped sleeve projecting from said perpendicular wall comprising a first sleeve extending into a second sleeve, said first sleeve being provided with four equally spaced apertures, coinciding with said four axially threaded openings of said index plate, and projecting out of said perpendicular wall, without extending past said cylindrical section; said second sleeve being of lesser diameter than said first sleeve and extending outwardly past said first sleeve; an annular recession, being formed between said perpendicular wall, said cylindrical section and said sleeve, and being sized to receive said externally threaded flange, namely an outwardly extending cylindrical extension; said second sleeve containing a mounting hole for locating a bearing supporting said first journal of said unitary element; and means for fastening, inserted from the interior of said attachment adapter and traversing said four equally spaced apertures, is used for engaging in said four axially threaded openings of said index plate, whereby said torque converter is firmly joined, via said attachment adapter, to said power tool.

* * * * *